UNITED STATES PATENT OFFICE 2,541,221

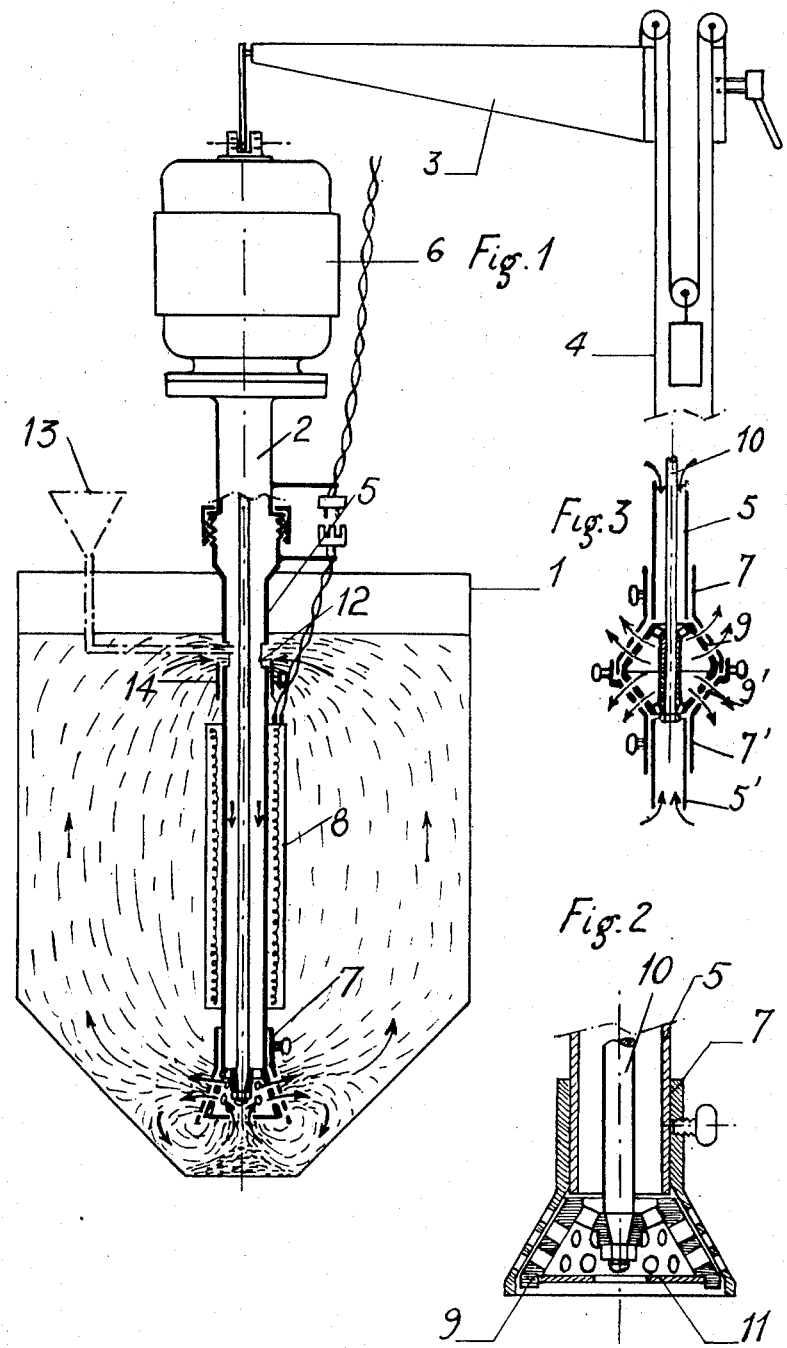

MIXING, DILUTING, EMULSIFYING, AND THE LIKE APPARATUS

George Wilfrid Edwards, Mitry-le-Neuf, France

Application November 25, 1946, Serial No. 712,108
In France November 27, 1945

13 Claims. (Cl. 259—96)

The invention has for its object improvements in apparatuses for mixing, diluting, emulsifying and otherwise treating any liquid, pulverulent, pasty and the like substances wherein an intense movement of the substances to be mixed, diluted, emulsified or the like is obtained through the action of a centrifugal pump operating inside the very mass of said substances; it has for its object a considerable improvement in the operation and efficiency of these apparatuses.

In accordance with the invention, the action of the centrifugal pump is obtained through a sort of rose, dipped inside the substances to be treated and the thickness of which is sufficient for producing the desired centrifugation, the liquid inside said rose being constantly urged outwardly through the openings thereof.

The inside of this rose is preferably in communication in accordance with the invention with one or several tubes which are more or less long and are provided each with one or more ports arranged at a more or less considerable distance from the rose so that the centrifugal pump urging the liquid out through the holes of the rose may thereby suck liquid inside the tube or tubes through the holes provided therein at more or less considerable distances from the rose. This has for its action to produce a considerable turbulency inside the liquids to be treated, which turbulency is transmitted to all the portions of the liquid contained in the receiver inside which the apparatus is dipped, and not only to the part of the liquid located in the vicinity of the apparatus acting centrifugally as was the case heretofore.

Preferably moreover in accordance with the invention the ports provided in the tube or tubes may be adjusted or closed as desired so as to allow a modification in the turbulency effect obtained.

On the other hand, there may be provided according to the invention on the outside of the rotary rose described hereinabove, a further stationary rose located at a preferably adjustable distance from the movable rose, as may be obtained easily in the case of two frustoconical roses through a relative sliding of one of the roses with reference to the other in a direction parallel to their common axis. This arrangement provides for the liquid centrifugally driven through the movable rose to impinge on the walls of the stationary rose whereby it is laminated between the two roses and this improves the mixing provided and allows in particular in the case of the suspension in water of a pasty or the like material the obtention of a substantially colloidal suspension.

In the case where the inside of the rotary rose is connected with a single tube, the otherwise open end of this rose opposed to the tube may in conformity with the invention be provided with a diaphragm. Preferably interchangeable diaphragms are used showing an opening or openings of different diameters or else an adjustable diaphragm may be used, these arrangements providing for an adjustment of the output of liquid introduced through the opening of the diaphragm.

As for the driving of the movable rose, it may be obtained in conformity with my invention through the agency of a shaft housed inside the above mentioned tube and which will show preferably a certain elasticity. Moreover, the tube inside which the shaft rotates may act as a heating tube through the operation of electric heating resistances for instance or of a steam jacket in the case where the substances to be mixed or diluted may require such heating.

Lastly, the invention includes preferably the provision of a suspension of the whole arrangement in any suitable manner or the carrying thereof by an arm secured in its turn to a stand or any other suitable means for allowing the apparatus to be dipped in a mixing vat of any suitable size.

Other objects and features of my invention will appear in the following description given out with reference to the accompanying drawings, which show diagrammatically two forms of execution of my invention.

Fig. 1 is a general cross-section of an apparatus according to my invention.

Fig. 2 is a corresponding cross-section at a larger scale of the rose and of the end of the tubes.

Fig. 3 is a cross-sectional view of a modification to Fig. 1.

Returning to Fig. 1, I designates the vat containing for instance, the liquids which it is desired to mix or to emulsify. The apparatus 2 is carried by a lateral arm 3, which is supported in its turn by an adjustable upright 4 whereby said apparatus 2 may be immersed inside the vat I to the desired depth.

This apparatus includes a long dismountable tube 5 carrying at its upper end a motor 6 such as an electric motor fed in any suitable manner. The tube 4 carries at its lower end a stationary rose 7 shown with further detail in Fig. 2 and the position of which with reference to the tube is adjustable; said tube is provided with an outer tubular sleeve 8 incorporating for instance, an electric heating resistance.

Inside the rose 7 is arranged in conformity with the invention as shown in Fig. 2, another rotary rose 9 showing preferably a certain thickness as apparent from the drawing.

This rose 9 is carried by a shaft 10 showing a certain elasticity, said shaft being housed inside the tube 5 and driven by the motor 6. At its lower end, the rose 9 is provided moreover with a diaphragm 11. In conformity with the invention the opening in said diaphragm is preferably adjustable or else it is possible to mount on the rose a plurality of diaphragms of differently sized openings.

At its upper end, the tube 5 is provided with at least one opening 12 adapted to be more or less closed by a sleeve 14.

A funnel filling arrangement 13 allows introducing as required into the tube 5 any substance to be added to the liquid or paste to be mixed.

The above described arrangement operates in the following manner:

The rose 9 is started rotating by the motor 6, through the agency of the shaft 10 and forms a sort of centrifugal pump which urges the liquids inside said rose outwardly through the holes of said rose and through those of the rose 7, the distances between the two roses being predetermined and adjustable through the position of the rose 7 with reference to the tube 5.

The presence of the stationary rose 7 located at a small distance from the rose 9 has for its object to constrain the liquid passing out of said rose to be submitted on one hand to the action of a violent shock against the walls of said stationary rose and on the other hand, to a lamination which has tendency to provide a still greater homogeneity of the liquid phase.

This centrifugal expulsion of the liquid through the roses 7 and 9 produces an intense circulation of the liquid throughout the vat 1 as illustrated by the arrows. Part of the liquid is driven upwardly outside the sleeve 8 and enters again the tube 5 through the opening 12.

Another part, on the contrary is urged downwardly and reenters the rose system through the opening in the diaphragm 11.

It should be noticed that in case of the mixing of two liquids of a different specific weight, the lightest liquid rises outside the tube and returns into it through its top while the heaviest liquid is sucked in through its lower end, both liquids being mixed together inside the rose 9.

In the case, where it is desired to incorporate one substance inside another substance, the substance to be incorporated is introduced at the beginning of operation through the funnel 13 directly into the opening 12 of the tube 5, said incorporation being executed preferably with reduced proportions.

Fig. 3 shows a modification of the arrangement illustrated in Figs. 1 and 2. In this case instead of a single rose 9 of frustoconical shape, there are provided two roses 9 and 9' oppositely arranged on their bases as apparent on the drawing, and carried by the same shaft. These two roses are housed inside two stationary roses 7 and 7' of corresponding shape carried by two tubes 5 and 5' located to each side of the system of roses 9 and 9'. This provides a substantially symmetrical arrangement wherein liquid is sucked downwardly inside the tube 5 and upwardly inside the tube 5', said two liquids mixing inside the double rose arrangement and being urged to the outside of the latter and thenafter returning into the tubes 5 and 5' through the terminal openings thereof.

The openings considered in the tubes, may be provided at different levels in the tubes 5 and 5', one or more or all of said openings being adapted to be closed as desired so that it may be possible to select the points of reintroduction of the liquid into the tubes.

Obviously, many modifications may be brought to the arrangements disclosed without widening the scope of the invention as defined in accompanying claims.

What I claim is:

1. An apparatus for mixing, diluting, emulsifying and otherwise treating liquid, pulverulent, pasty and the like substances including in combination with a vat for containing said substances, a rotary rose shaped member adapted to be dipped inside the vat and the perforated walls of which have a sufficient thickness to produce a centrifugal action on the material passing through the rose, a tube in open communication with the rotary rose and provided with at least one opening at a distance from the rose, a diaphragm with a calibrated opening closing the end of the rose opposed to the tube and means for rotating said rotary rose.

2. An apparatus for mixing, diluting, emulsifying and otherwise treating liquid, pulverulent, pasty and the like substances including in combination with a vat containing said substances a rotary rose shaped member adapted to be dipped inside the vat and the perforated walls of which have a sufficient thickness to produce a centrifugal action on the material passing through the rose, a tube in open communication with said rose and provided with at least one opening at a distance from the rose and a removable diaphragm with a calibrated opening closing the end of the rose opposed to the tube.

3. An apparatus for mixing, diluting, emulsifying and otherwise treating liquid, pulverulent, pasty and the like substances including in combination with a vat containing said substances a rotary rose shaped member adapted to be dipped inside the vat and the perforated walls of which have a sufficient thickness to produce a centrifugal action on the material passing through the rose, a stationary rose surrounding the rotary rose at a small distance therefrom, a tube in open communication with the rotary rose and provided with at least one opening at a distance from the rose, a diaphragm with a calibrated opening closing the end of one rose facing the tube and means for rotating said rotary rose.

4. An apparatus for mixing, diluting, emulsifying and otherwise treating liquid, pulverulent, pasty and the like substances including in combination a vat adapted to contain said substances, a rotary axially rose-shaped member open at both ends immersed inside the vat and the perforated walls of which have sufficient thickness to produce a centrifugal action on the material passing through same, means for conveying the substances inside said rose, both through the two axial ends of said rose, means for rotating said rose, a stationary rose surrounding the rotary rose at a small distance therefrom and adapted to laminate the substances projected centrifugally out of the latter and to distribute them inside the mass contained in the vat.

5. An apparatus for mixing, diluting, emulsifying and otherwise treating liquid, pulverulent, pasty and the like substances including in combination a vat adapted to contain said substances, a rotary axially rose-shaped member open at both ends immersed inside the vat and the perforated walls of which have sufficient thickness to produce a centrifugal action on the material passing through same, means for conveying the substances inside said rose, through the two axial ends of said rose, a yielding shaft for rotating said rose, a stationary rose surrounding the rotary rose at a small distance therefrom and adapted to laminate the substances projected centrifugally out of the latter and to distribute them inside the mass contained in the vat.

6. An apparatus for mixing, diluting, emulsifying and otherwise treating liquid, pulverulent, pasty and the like substances including in combination a vat adapted to contain said substances, a rotary axially rose-shaped member open at both ends immersed inside the lower part of the vat with its axis located vertically and the perforated walls of which have sufficient thickness to produce a centrifugal action on the material passing through same, means for conveying the substances inside said rose, both through the top and the bottom of said rose, means for rotating said rose, a stationary rose surrounding the rotary rose at a small distance therefrom and adapted to laminate the substances projected centrifugally out of the latter and to distribute them inside the mass contained in the vat.

7. An apparatus for mixing, diluting, emulsifying and otherwise treating liquid, pulverulent, pasty and the like substances including in combination a vat adapted to contain said substances, a rotary axially rose-shaped member open at both ends immersed inside the lower part of the vat, the perforated walls of which have sufficient thickness to produce a centrifugal action on the material passing through same, one tube in permanent communication with the inside of said rotary rose through one of the openings thereof and provided with at least one opening inside the container vat, a yielding shaft passing through said tube, and carrying at its end the rose, means for driving said shaft and a stationary rose surrounding the rotary rose at a small distance therefrom and adapted to laminate the substances projected centrifugally out of the latter and to distribute them inside the mass contained in the vat.

8. An apparatus for mixing, diluting, emulsifying and otherwise treating liquid, pulverulent, pasty and the like substances including in combination a vat adapted to contain said substances, a rotary axially rose-shaped member open at both ends immersed inside the lower part of the vat with its axis located vertically and the perforated walls of which have sufficient thickness to produce a centrifugal action on the material passing through same, one tube in permanent communication with the inside of said rotary rose through one of the openings thereof and provided with at least one opening in the vicinity of the upper layer of material in the container vat, means for rotating said rose and a stationary rose surrounding the rotary rose at a small distance therefrom and adapted to laminate the substances projected centrifugally out of the latter and to distribute them inside the mass contained in the vat.

9. An apparatus for mixing, diluting, emulsifying and otherwise treating liquid, pulverulent, pasty and the like substances including in combination a vat adapted to contain said substances, a rotary axially rose-shaped member open at both ends immersed inside said vat with its axis located vertically and the perforated walls of which have sufficient thickness to produce a centrifugal action on the material passing through same, one tube in permanent communication with the inside of said rotary rose through one of the openings thereof and provided with at least one opening in the vicinity of the upper layer of material in the container vat, means for rotating said rose and a stationary rose surrounding the rotary rose at a small distance therefrom and adapted to laminate the substances projected centrifugally out of the latter and to distribute them inside the mass contained in the vat.

10. An apparatus for mixing, diluting, emulsifying and otherwise treating liquid, pulverulent, pasty and the like substances including in combination a vat adapted to contain said substances, a rotary axially rose-shaped member open at both ends immersed inside said vat with its axis located vertically and the perforated walls of which have sufficient thickness to produce a centrifugal action on the material passing through same, one tube in permanent communication with the inside of said rotary rose through one of the openings thereof and provided with at least one opening located inside the container vat, a diaphragm closing the second opening of said rose, a calibrated hole inside said diaphragm, means for rotating said rose and a stationary rose surrounding the rotary rose at a small distance therefrom and adapted to laminate the substances projected centrifugally out of the latter and to distribute them inside the mass contained in the vat.

11. An apparatus for mixing, diluting, emulsifying and otherwise treating liquid, pulverulent, pasty and the like substances including in combination a vat adapted to contain said substances, a rotary axially rose-shaped member open at both ends immersed inside said vat with its axis located vertically and the perforated walls of which have sufficient thickness to produce a centrifugal action on the material passing through same, one tube in permanent communication with the inside of said rotary rose through one of the openings thereof and provided with at least one opening inside the container vat, a diaphragm closing the second opening of said rose, a calibrated hole inside said diaphragm, a yielding shaft passing vertically through said tube, and carrying at its lower end the rose, means for driving said shaft and a stationary rose surrounding the rotary rose at a small distance therefrom and adapted to laminate the substances projected centrifugally out of the latter and to distribute them inside the mass contained in the vat.

12. An apparatus for mixing, diluting, emulsifying and otherwise treating liquid, pulverulent, pasty and the like substances including in combination a vat adapted to contain said substances, a rotary axially rose-shaped member open at both ends immersed inside the lower part of the vat with its axis located vertically and the perforated walls of which have sufficient thickness to produce a centrifugal action on the material passing through same, one tube in permanent communication with the inside of said rotary rose through one of the openings thereof and provided with at least one opening in the vicinity of the upper layer of material in the container vat, a diaphragm closing the second opening of said rose, a calibrated hole inside said diaphragm, a yielding shaft passing vertically through said tube, and carrying at its lower end the rose, means for driving said shaft and a stationary rose surrounding the rotary rose at a small distance therefrom and adapted to laminate the substances projected centrifugally out of the latter and to distribute them inside the mass contained in the vat.

13. An apparatus for mixing, diluting, emulsifying and otherwise treating liquid, pulverulent, pasty and the like substances including in combination a vat adapted to contain said substances, a rotary axially rose-shaped member open at both ends immersed inside said vat with its axis located vertically and the perforated walls of which have sufficient thickness to produce a centrifugal action on the material passing through same, one tube in permanent communication with the inside of said rotary rose through one of the openings thereof and provided with at least one other opening inside the container vat, means for introducing inside said last named opening, together with the substances contained in the vat, other substances to be mixed with said first named substances, a diaphragm closing the second opening of said rose, a calibrated hole inside said diaphragm, a yielding shaft passing vertically through said tube, and carrying at its lower end the rose, means for driving said shaft and a stationary rose surrounding the rotary rose at a small distance therefrom and adapted to laminate the substances projected centrifugally out of the latter and to distribute them inside the mass contained in the vat.

GEORGE WILFRID EDWARDS.

REFERENCES CITED

The following references are of record in the file of this patent:

UNITED STATES PATENTS

| Number | Name | Date |
|---|---|---|
| 1,031,666 | Richmond | July 2, 1912 |
| 1,819,118 | Preleuthner | Aug. 18, 1931 |
| 2,096,728 | Bighouse | Oct. 26, 1937 |
| 2,140,315 | Dollinger | Dec. 13, 1938 |
| 2,169,339 | Ditto | Aug. 15, 1939 |
| 2,244,815 | Underwood | June 10, 1941 |

FOREIGN PATENTS

| Number | Country | Date |
|---|---|---|
| 486,215 | Germany | Nov. 14, 1929 |